United States Patent [19]

Buck

[11] 3,732,456

[45] May 8, 1973

[54] WIDEBAND DEFLECTION MODULATED SEMICONDUCTOR AMPLIFIER

[75] Inventor: Daniel C. Buck, Hanover, Md.

[73] Assignee: Westinghouse Electric Corporation, Pittsburgh, Pa.

[22] Filed: Oct. 27, 1971

[21] Appl. No.: 192,811

[52] U.S. Cl. ......................315/3, 315/3.5, 315/5.24, 313/65 AB

[51] Int. Cl. ..........................H01j 23/16, H01j 29/96

[58] Field of Search ......................315/1, 3, 5.24, 3.5, 315/5.25; 313/85, 65 AB

[56] References Cited

UNITED STATES PATENTS

| | | | |
|---|---|---|---|
| 2,650,956 | 9/1953 | Heising | 315/3 X |
| 3,020,438 | 2/1962 | Sziklai | 315/3 X |
| 2,731,560 | 1/1956 | Krawinkel | 328/228 X |
| 3,221,207 | 11/1965 | Kaufman et al. | 328/229 X |
| 2,064,469 | 12/1936 | Haeff | 328/229 |
| 2,981,891 | 4/1961 | Horton | 315/3 X |
| 3,366,829 | 1/1968 | Clapp | 315/3 |

FOREIGN PATENTS OR APPLICATIONS

| | | | |
|---|---|---|---|
| 1,541,050 | 8/1969 | Germany | 315/5.24 |

*Primary Examiner—*
*Attorney—*F. H. Henson et al.

[57] ABSTRACT

Wideband performance is obtained in a deflection modulated microwave traveling wave electron beam semiconductor amplifier by tilting the travelling wave collection circuit with respect to the electron beam axis such that the phase velocity of the collection circuit matches the longitudinal component of the electron beam velocity. Trimming of the longitudinal component to obtain this match is obtained by varying the beam voltage.

12 Claims, 4 Drawing Figures

WIDEBAND DEFLECTION MODULATED SEMICONDUCTOR AMPLIFIER

BACKGROUND OF THE INVENTION

1. Field of the Invention

This invention relates generally to semiconductor current amplification means and more particularly to a high power microwave amplification device in which a microwave signal is applied to a traveling wave structure which modulates the deflection of an electron beam directed to a semiconductor target.

2. Description of the Prior Art

The present invention is based on the observation that by irradiating the P+ side of a back-biased semiconductor P+ I N+ diode with high energy electrons (in the order of 10kev or more) electron hole pairs are generated. The holes are diffused out quickly to the P+ contact, leaving the electrons to drift across the intrinsic region to the N+ contact. Electron multiplication ratios in the order of 2000 to 4000 have been observed. Since sub-nanosecond ($10^{-9}$ sec.) rise times for the injected current pulse has been observed, the possibility of high power microwave amplification becomes feasible. The details of such a semiconductor configuration have been reported in a publication appearing in the Proceedings of the Tenth Modulator Symposium dated May, 1968, at pages 108–154.

In order to amplify microwave signals utilizing the principle outlined above, one must modulate the incident electron beam at $1 \times 10^9$ Hertz (GHz) rates in such a way that the incident beam current on the semiconductor P-N junction varies at these microwave rates. Generally, this can be accomplished with either deflection or current density modulation of the beam directed to a target which is comprised of back-biased semiconductor P-N junctions. While neither modulation method appears particularly advantageous over the other, it does appear that deflection modulation has the potential of giving high efficiency performance through a "class-C" type of operation wherein the deflection excursion is greater than the width of the semiconductor target so that an "on-off" mode of operation is achieved.

Insofar as the prior art is concerned, electron beam devices utilizing semiconductor targets are well known to those skilled in the art, one example of which is disclosed in U.S. Pat. No. 3,020,438 issued to G. C. Sziklai. Also slow wave circuits including meander line means associated therewith for deflecting an electron beam is also known in the art. An example of the latter is taught in U.S. Pat. No. 3,504,222 issued to M. Fukushima. Microwave apparatus including a modulated ribbon electron beam is taught in U.S. Pat. No. 3,366,829 issued to R. E. Clapp.

While these patents teach apparatus which purportedly operates in the manner intended, the present invention has for its object the provision of an improved deflection modulated microwave amplifier wherein a flat or ribbon type electron beam is modulated in accordance with a microwave input signal and then is made to land on an elongated P-N junction which is built into a microwave transmission circuit.

SUMMARY

Briefly, the subject invention comprises in combination a flat beam electron gun which is directed toward a collection circuit which includes an elongated back-biased P-N junction which is tilted at an angle $\theta$ with respect to a plane perpendicular to the electron beam phase front of a flat electron beam generated by the gun. The angle $\theta$ is defined such that the $\sin \theta = v_b/v_p$, where $v_b$ is the beam velocity and $v_p$ is the phase velocity of the collection circuit. Preferably a meander line deflection circuit coupled to a microwave source is located intermediate the electron gun and the collection circuit. If the collection circuit is placed perpendicular to the flat beam which is being deflected by the microwave signal applied to the meander line deflection circuit, one half of the output power will be lost as power flows both ways in the circuit. However, by matching the velocities $v_p$ and $v_b/\sin\theta$ with the collection circuit tilted as indicated, power will flow unidirectionally from one end of the collection circuit when the opposite end is terminated in a matched load.

DESCRIPTION OF THE PREFERRED EMBODIMENT

Figures 1, 2, 3, 4:
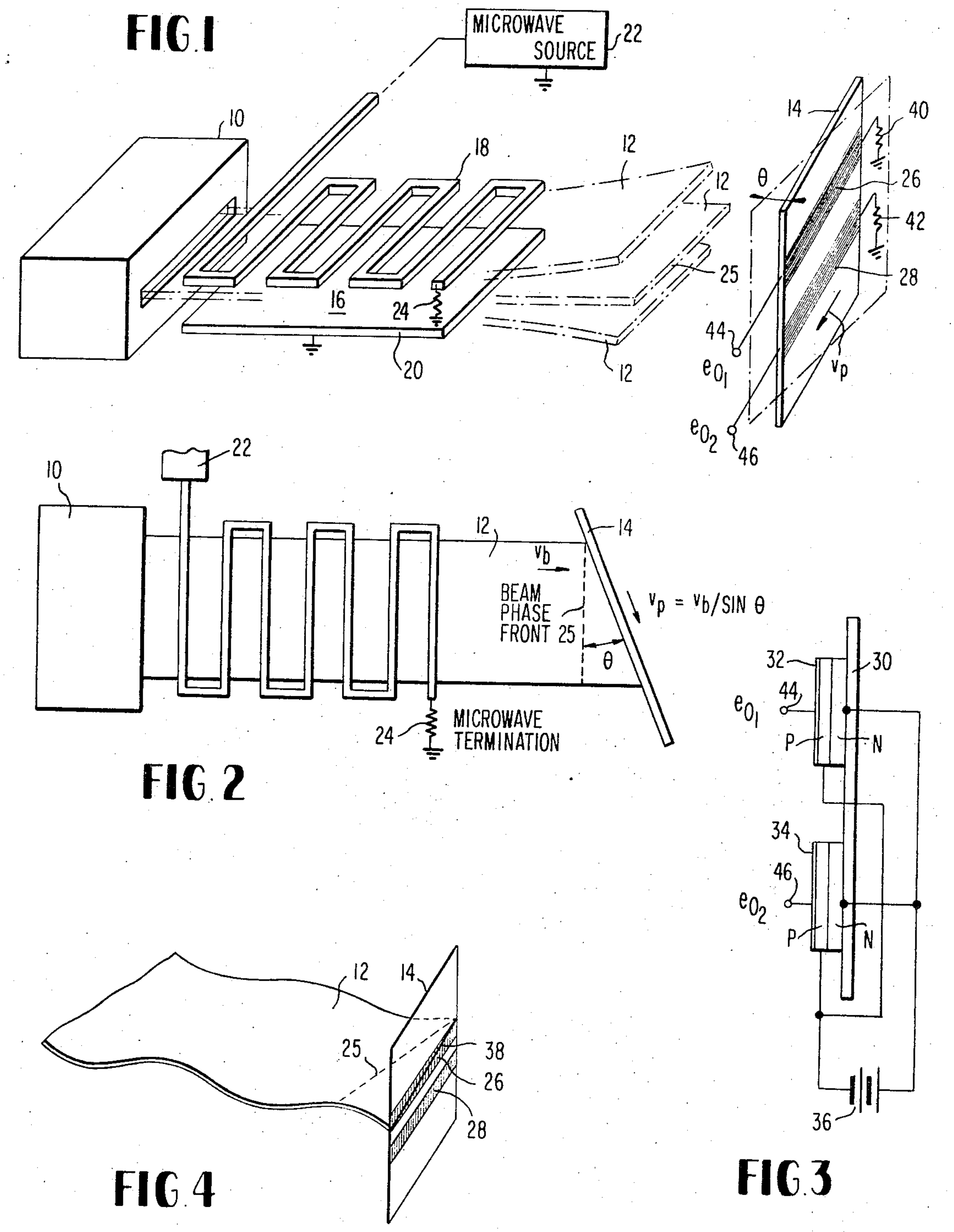
FIG. 1 is a perspective view generally illustrative of the preferred embodiment of the subject invention.
FIG. 2 is a top plan view of the embodiment shown in FIG. 1.
FIG. 3 is an electrical schematic diagram of the collection circuit utilized by the embodiment shown in FIGS. 1 and 2.
FIG. 4 is a diagram of a flat electron beam which is deflected by the deflection circuit shown in FIGS. 1 and 2 toward a tilted collection circuit and which is helpful in understanding the operation of the subject invention.

Referring now to the drawings wherein like numerals refer to like parts throughout, attention is first directed to FIGS. 1 and 2 which disclose, inter alia, an electron gun 10 selectively proportioned to deliver a thin ribbon like beam of electrons 12 which are directed to a collector circuit 14. Electron guns for generating ribbon like beams of electrons are well known to those skilled in the art. In addition to the Clapp patent, supra, other examples are disclosed in U.S. Pat. No. 2,592,228, Adams and U.S. Pat. No. 2,961,492, Carbrey-Feldman. When desirable, the ribbon beam may be replaced by a plurality of cylindrical type beams which are aligned in a common plane.

Intermediate the ribbon beam electron gun 10 and the collector circuit 14 is a beam modulator comprising a deflection circuit 16 including a slow wave circuit for microwave use including a meander line 18 of conductive material and an oppositely disposed ground electrode 20 with the ribbon electron beam 12 passing therebetween. The ground electrode 20 is returned to a point of reference potential illustrated as ground and the meander line conductor 18 is coupled at one end to a microwave signal source 22 while its opposite end is terminated in a suitable microwave termination 24. In the absence of a microwave signal applied to the meander line structure 18, the ribbon beam 12 will be unaffected and directed in a straight line towards the collector circuit 14. When a microwave input signal is applied to the meander line deflection circuit 16 from the source 22, the ribbon beam 12 will be caused to ripple as shown in FIG. 4. The phase front 25 of the beam 12 at any point along the longitudinal axis of the beam will then appear to move up and down as shown in FIG. 1. Where the collection circuit 14 is located perpendicular to the longitudinal axis of the ribbon beam 12, i.e., coextensive with the beam front 25, the beam will move up and down, i.e., scan the face of the collection circuit which is typical of known prior art apparatus. In such configurations where the entire phase front 25 of the ribbon beam strikes the collection circuit 14 at the same instant, a dispersive effect takes place wherein power flows multidirectionally along the impingement line so that if power is collected from one side of the collection circuit with the opposite side terminated in a matched mode, substantially one half of the output power would be coupled to the output while the other half would be coupled to the load. Furthermore, if one shorts one end e.g., the load end of the circuit, the device becomes narrow band.

The present invention has for its objective tilting the collection circuit 14 at an angle $\theta$ with respect to the phase front 25 of the deflected ribbon beam 12 such that, $$\sin\theta = v_b/v_p \qquad (1)$$

where $v_b$ is the beam velocity and $v_p$ is the phase velocity of the collection circuit. The term $v_b$ can furthermore be mathematically expressed as:

$$v_b = \sqrt{2eV/m} \qquad (2)$$

where $e/m$ is the charge to mass ratio of the electron which has a value of $1.76 \times 10^{11}$ coulomb per kilogram, and wherein $V$ is the acceleration potential or beam voltage of the electron gun 10. From equation (2) it can be seen that the electron beam velocity can be altered by adjustments in the beam voltage. Therefore for any selected value of $\theta$, the beam voltage can be varied so as to satisfy equation (1).

In the present invention the collector circuit 14 is comprised of two microstrip target circuits 26 and 28, each respectively comprised of P-N junctions of predetermined width sandwiched between a ground plane 30 and the micro-strip conductors 32 and 34, such as shown in FIG. 3. A bias source 36 is coupled across both P-N regions so as to back-bias the junctions. When irradiated by the electron beam 12, the P-N junctions will provide respective output signals $e_{o_1}$ and $e_{o_2}$ as long as the beam phase front strikes the respective targets.

As shown by FIG. 4, the tilting of the collection circuit 14 (FIG. 2) causes the beam phase front 25 to first strike one edge of a semiconductor target for example and then move across the face thereof to the other edge much in the same manner as an oblique wave in the sea breaks upon the shore line. Accordingly, if a point on the trace 38 (FIG. 4) of the ribbon beam 12 on the semiconductor target moves at the proper speed, i.e., the phase velocity $v_p$ of the collection circuit output power will flow unidirectionally towards one edge of the target when the opposite edge is properly terminated, such as by means of the loads 40 and 42. By coupling output terminals 44 and 46 to the respective microstrip circuits 26 and 28 amplified signals $e_{o_1}$ and $e_{o_2}$ of a "class C" type of operation will be provided at the output terminals 44 and 46 due to the fact that the back-biased semiconductor P-N junctions create electron hole pairs when struck by the deflected beam 12. Since the holes are diffused out very quickly, electrons drift across the intrinsic region giving rise to a current gain.

What has been shown and described, therefore, is a wideband deflection modulated microwave traveling wave electron beam semiconductor amplifier which overcomes power loss by tilting the collection circuit 14 at an angle $\theta$ such that $\sin\theta = v_b/v_p$ which will cause the electron beam deflection wave fronts to intersect the collection circuit in phase with the traveling wave signal.

Having thus described what is at present considered to be the preferred embodiment of the subject invention, I claim:

1. A microwave amplifier comprising in combination:
   - an electron beam source adapted to generate a relatively flat beam of electrons which are directed as an elongated phase front to a collection circuit;
   - input means for the application of a microwave input signal;
   - electron beam modulation means coupled to said input means, being located intermediate said source and said collection circuit for modulating said relatively flat beam of electrons such that the beam phase front impinges on said collection circuit in response to the effect of said microwave input signal on said beam;
   - said collection circuit including a relatively narrow elongated target member extending across one dimension of said collection circuit and being adapted to be irradiated by the electrons comprising said phase front and producing an output signal having a predetermined phase velocity, said collection circuit additionally being angularly disposed with respect to said phase front such that the phase velocity of said output signal is substantially matched to the beam velocity; and
   - output means coupled to said target member for coupling said output signal to an external circuit.

2. The invention as defined by claim 1 wherein said beam modulation means comprises a traveling wave circuit which deflection modulates said beam.

3. The invention as defined by claim 2 wherein said target member is adapted to be in substantial planar alignment with said beam phase front at least during a portion of the deflection of said beam on said target member.

4. The invention as defined by claim 2 wherein said collection circuit is angularly disposed with respect to said beam phase front by an angle $\theta$ wherein the trigonometric $\sin\theta$ is substantially equal to the ratio of the beam velocity $v_b$ of the relatively flat beam of electrons to the phase velocity $v_p$ of the output signal.

5. The invention as defined by claim 4 wherein said target member comprises at least one semiconductor target.

6. The invention as defined by claim 5 wherein said semiconductor target comprises an elongated P-N semiconductor junction and additionally including bias means coupled thereto for reverse biasing said P-N junction.

7. The invention as defined by claim 6 and additionally including a matched load coupled to one end of said elongated target with said output means being coupled to the opposite end thereof.

8. The invention as defined by claim 2 wherein said traveling wave circuit comprises metallic meander line means coupled at one end to said input means and additionally including a microwave termination connected to the opposite end thereof, and a ground electrode oppositely disposed from said meander line means with said flat beam of electrons passing therebetween.

9. The invention as defined by claim 8 wherein said flat beam of electrons defines a ribbon beam of electrons.

10. The invention as defined by claim 8 wherein said flat beam of electrons comprises a plurality of cylinder type beams aligned in side-by-side relationship to form a substantially flat electron beam.

11. The invention as defined by claim 9 wherein said elongated target member comprises an elongated reversed biased P-N semiconductor junction of predetermined length and width with said width dimension running substantially perpendicular to said beam phase front.

12. The invention as defined by claim 11 wherein said collection circuit is tilted at an angle $\theta$ with respect to said beam phase front such that $\sin\theta = v_b/v_p$, where $v_b$ is the beam velocity of said ribbon beam and $v_p$ is equal to the phase velocity of said output signal.

* * * * *